UNITED STATES PATENT OFFICE.

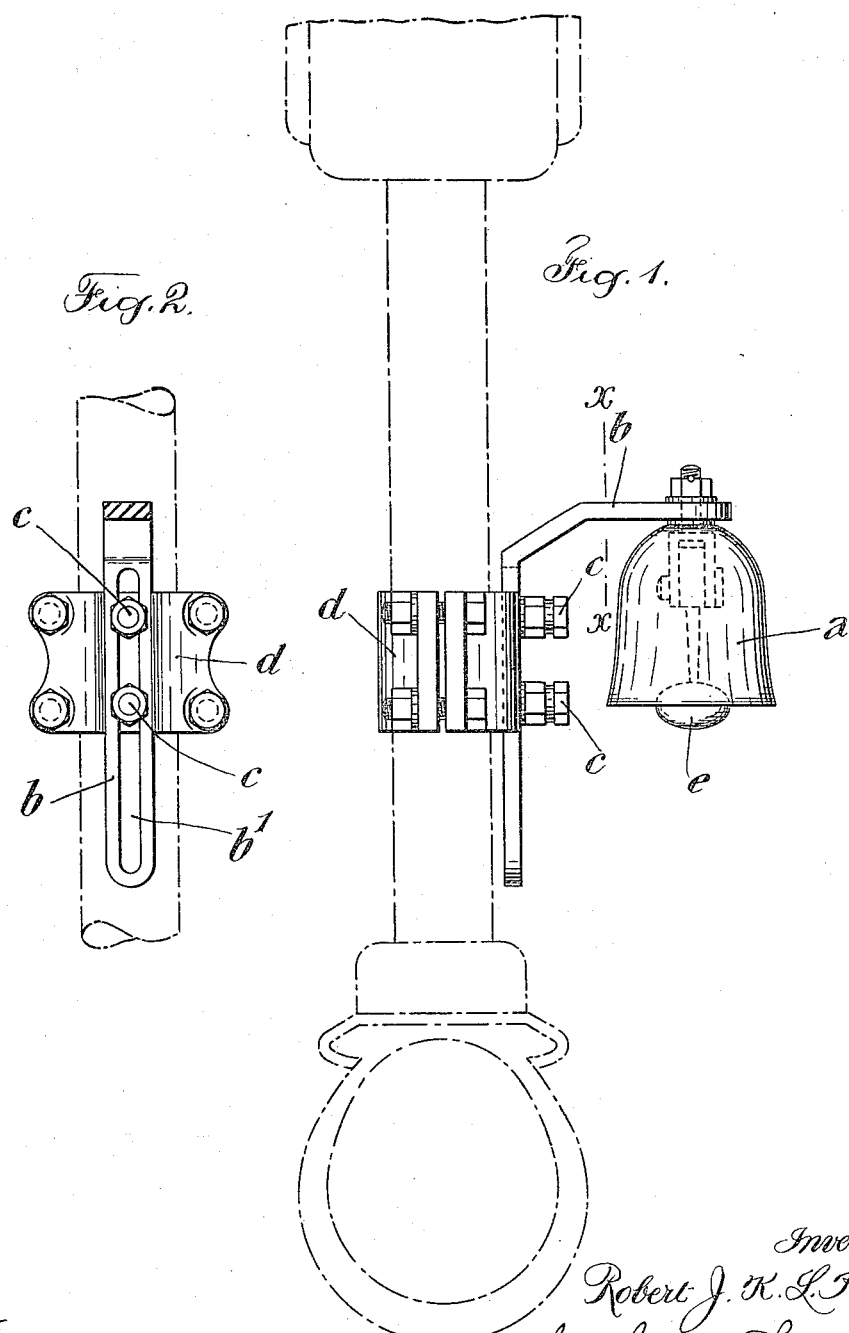

ROBERT JOSEPH KARL LUDWIG KAISER, OF GENEVA, SWITZERLAND.

SPEED-INDICATOR.

1,159,391.

Specification of Letters Patent.

Patented Nov. 9, 1915.

Application filed August 27, 1909. Serial No. 515,362.

*To all whom it may concern:*

Be it known that I, ROBERT J. K. L. KAISER, a citizen of Switzerland, residing at Geneva, Switzerland, have invented an Improvement in Speed-Indicators, of which the following is a specification.

This invention relates to a device for indicating whether or not a given apparatus with which the device is employed is moving at a less or a greater rate than the predetermined speed.

Heretofore I am aware that various devices have been made and utilized to give a signal when a predetermined speed is exceeded. For instance, in motor vehicles speed indicator devices have been employed to indicate audibly, visibly or otherwise when the vehicle is traveling at a greater than the lawful predetermined speed. Now in the device made in accordance with my present invention, the construction is such that the signal is operated practically continuously from the time the vehicle or other apparatus begins to move until the speed acquired is that predetermined, after which the device automatically ceases to act as a signal and this cessation is maintained as long as the excess of speed is continued.

The sounding of this signal on a motor vehicle, for which use the device according to my present invention is particularly applicable, is advantageously employed to indicate the approach of the car, to warn pedestrians and also to make it unnecessary for the driver to blow a horn as is customary in approaching crossings, as well as being the means of indicating to the police or other officials, when the question arises, as to whether or not the car is traveling within the lawful speed limits.

It will be understood that I do not wish to limit my invention to any particular means, whether visual, audible or otherwise, for giving the desired signal; the invention comprising the speed indicator constituting means which are normally operative as a signal during the continued operation of an apparatus within a predetermined speed limit and which means are automatically rendered inoperative when this speed limit is exceeded.

In the drawing, Figure 1 is a side elevation of the device embodying the features of my present invention; the same being illustrated as attached to a spoke of a vehicle wheel which latter together with a portion of the hub and tire of the motor vehicle are indicated in dotted lines in this figure. Fig. 2 is an elevation and partial section on line $x$, $x$, Fig. 1.

Referring particularly to the drawing which is only indicative of one form of device for carrying out my present invention, it will be seen that I may employ for instance, a bell indicated at $a$. This bell is fixed to one end of an arm $b$ and the arm $b$ is adapted to fit and be slidably adjustable between suitable ribs provided therefor on the side of the bracket $d$; the arm $b$ being provided with a slot $b^1$ through which the clamp bolts $c$ pass, by which latter as will be understood, the arm $b$ with the bell $a$ will be secured in the desired position in the bracket $d$.

The bell $a$ is provided with a clapper $e$ which is preferably pivotally mounted therein so as to swing only in a plane which is substantially parallel to the plane of rotation of the vehicle wheel. It will be apparent that the bracket $d$ will be fitted around the spoke of the wheel and secured thereto and that as the vehicle starts to move, the clapper $e$ will strike the bell $a$ to give an audible signal twice during each revolution of the wheel until the predetermined speed of the vehicle has been reached; this predetermined speed of course depending upon the distance that the bell is placed from the center of rotation or the axis of the wheel. Furthermore, it will be apparent that after this predetermined speed has been acquired by the vehicle, the clapper $e$ will stand in a radial line during the complete revolution of the wheel and that no signal will be produced thereby.

I claim as my invention:

1. In a device of the character described, the combination with a rotary element, of a bell body adjustable thereon and rotating therewith, a bell-clapper pivoted in said body, and adapted to contact with said body during the rotation of said element until said element exceeds a predetermined speed, when, by centrifugal force, the clapper is held out of contact with said body, and means for holding said body in adjusted position on said element.

2. A speed indicator comprising a bracket adapted to be secured to a revoluble member of an apparatus the speed of which is to be indicated, an arm, a bell secured to said arm in such a position that the closed end of the bell is nearest to the axle of rotation of the said revoluble member, and means for adjustably securing the said arm to the said bracket to vary the distance between the bell and the axis of rotation of the revoluble member.

In testimony whereof I have affixed my signature in presence of two witnesses.

DR. ROBERT JOSEPH KARL LUDWIG KAISER.

Witnesses:
TH. MERL,
M. JONES.

Copies of this patent may be obtained for five cents each, by addressing the "Commissioner of Patents, Washington, D. C."